United States Patent
Bartz et al.

(10) Patent No.: US 9,581,085 B2
(45) Date of Patent: Feb. 28, 2017

(54) HOT STREAK ALIGNMENT FOR GAS TURBINE DURABILITY

(71) Applicant: General Electric Company, Schenectady, NY (US)

(72) Inventors: Robert Joseph Bartz, Cincinnati, OH (US); Joseph Steven Bubnick, Cincinnati, OH (US); Scott Matthew Bush, Liberty Township, OH (US); Kevin Robert Feldmann, Cincinnati, OH (US); Robert Alan Frederick, West Chester, OH (US); Craig William Higgins, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 758 days.

(21) Appl. No.: 13/836,426

(22) Filed: Mar. 15, 2013

(65) Prior Publication Data

US 2014/0318141 A1 Oct. 30, 2014

(51) Int. Cl.
| | |
|---|---|
| *F01D 9/04* | (2006.01) |
| *F01D 25/12* | (2006.01) |
| *F01D 9/02* | (2006.01) |
| *F02C 7/12* | (2006.01) |
| *F01D 5/18* | (2006.01) |

(52) U.S. Cl.
CPC ............. *F02C 7/125* (2013.01); *F01D 5/186* (2013.01); *F01D 9/023* (2013.01); *F01D 9/041* (2013.01); *F01D 25/12* (2013.01); *Y02T 50/676* (2013.01)

(58) Field of Classification Search
CPC .......... F01D 25/12; F01D 5/186; F01D 9/023; F01D 9/041; F02C 7/125; Y02T 50/676

USPC .................................. 60/805, 806; 415/115
See application file for complete search history.

(56) References Cited

U.S. PATENT DOCUMENTS

| | | | |
|---|---|---|---|
| 6,554,562 B2 | 4/2003 | Dudebout et al. |
| 7,836,703 B2 | 11/2010 | Lee et al. |
| 7,878,761 B1 | 2/2011 | Liang |
| 7,984,607 B2 | 7/2011 | Sharma et al. |
| 8,087,893 B1 | 1/2012 | Liang |
| 8,104,292 B2 | 1/2012 | Lee et al. |
| 8,317,473 B1 | 11/2012 | Liang |

(Continued)

FOREIGN PATENT DOCUMENTS

| | | |
|---|---|---|
| CN | 102200034 A | 9/2011 |
| EP | 2775097 A2 | 9/2014 |
| WO | 2014055104 A1 | 4/2014 |

OTHER PUBLICATIONS

International Search Report and Written Opinion issued in connection with corresponding PCT Application No. PCT/US2014/013967 dated Dec. 18, 2014.

(Continued)

*Primary Examiner* — Nicholas J Weiss
*Assistant Examiner* — Dapinder Singh
(74) *Attorney, Agent, or Firm* — General Electric Company; William Scott Andes

(57) ABSTRACT

Embodiments of hot streak alignment for gas turbine durability include structures and methods to align hot streaks with the leading edges of aligned first stage nozzle vanes in order to improve mixing of the hot streaks with cooling air at a stator nozzle of a first stage turbine and reduce usage of cooling air at first stage non-aligned stator nozzle vanes disposed adjacent to the aligned stator vanes.

18 Claims, 4 Drawing Sheets

(56) References Cited

U.S. PATENT DOCUMENTS

2005/0135921 A1 6/2005 Busch et al.
2008/0317585 A1* 12/2008 Lee et al. ................... 415/115
2009/0266080 A1 10/2009 Pieussergues et al.
2011/0217159 A1 9/2011 McMahan et al.

OTHER PUBLICATIONS

Unofficial English Translation of Chinese Office Action issued in connection with corresponding CN Application No. 201480016252.1 on Mar. 25, 2016.

* cited by examiner

HOT STREAK ALIGNMENT FOR GAS TURBINE DURABILITY

BACKGROUND

Present embodiments relate to a gas turbine engine having a fuel nozzle within a combustor that discharges hot gasses into a high pressure turbine. More particularly, the present embodiments include those that relate to combustion gas hot streaks which are aligned in a circumferential direction with every other first stage nozzle vane and which allow for less cooling air usage at non-aligned vanes.

In a gas turbine engine, air is pressurized in a compressor and mixed with fuel in a combustor having a fuel nozzle thereby generating hot combustion gases which flow downstream through turbine stages. These turbine stages extract energy from the combustion gases. Flowise, the hot gasses enter a high pressure turbine which includes a first stage stator nozzle and a rotor assembly including a disk and a plurality of turbine blades. In further detail, the high pressure turbine first receives the hot combustion gasses from the combustor at the first stage stator nozzle that directs the combustion gases downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles turn the hot combustion gas in a manner to maximize extraction at the adjacent downstream turbine blades.

The first and second rotor disks are joined to the compressor by a corresponding rotor shaft for powering the compressor during operation. The turbine engine may include a number of stages stators and rotors wherein static airfoils, commonly referred to as vanes, are interspaced an axial direction in the engine between rotating airfoils commonly referred to as blades. A multi-stage low pressure turbine follows the two stage high pressure turbine and is typically joined by a second shaft to a fan disposed upstream from the compressor in a typical turbofan aircraft engine configuration for powering an aircraft in flight.

As the combustion gasses flow downstream through the turbine stages, energy is extracted therefrom and the pressure of the combustion gas is reduced. The combustion gas is used to power a turbine output shaft for power and marine use or provide thrust in aviation usage.

More specifically, a combustor includes any number of combustor fuel nozzles which deliver fuel and facilitate mixing a method of compressed air to achieve a stable flame in the combustor chamber. At the combustor exit where combustion gas exits, a temperature profile will indicate that there are hotter and colder zones. The hotter zones are commonly referred to as hot streaks. Hot streaks are typically randomly arranged about a combustor relative to the first stage high pressure turbine nozzles. However aiming of hot streaks may occur for integer ratios of fuel nozzles and stator vanes. In such an arrangement, hot streaks may be aimed at open areas of nozzle segments between the vanes so as to limit damage on the material forming the nozzle structures. Such damage may include oxidation, thermo-mechanical fatigue and a commensurate reduction in durability. This reduction in durability leads to increased replacement intervals which come at a high cost to turbine engine operators.

Some engines include the stator nozzle assembly being, for example, an annular ring formed as a single piece. Other engines include the turbine stator nozzle assembly being formed as an annulus by a plurality of stator nozzle segments arranged in an annular array. The nozzle segments each include an inner band, an outer band and a vane extending therebetween. The vanes are hollow and receive a portion of pressurized air from the compressor which is used for cooling the vanes during operation.

There are two problems with the current state of the art. First, in allowing the hot streak to pass between vanes unimpeded, the hot streak will reach components downstream of the first stage stator nozzle with only limited mixing with air provided for turbine cooling. This can lead to damage of the downstream components. Second, present designs do not address issues with cooling air, specifically the continual desire to reduce the cooling air usage or control losses due to cooling air use in a turbine engine.

As may be seen in the foregoing section, there is a need for design improved mixing of hot streak gases while limiting damage to downstream components of the first stage nozzle. Additionally, a need exists to increase durability of the turbine components including the first stage stator nozzle and turbine blades as well as for embodiments including multiple-stage assemblies.

In the past, an unmet need has also been to decrease the usage of cooling gas at vanes which are not directly impinged by any hot streak so that some portion of such cooling air may be utilized to improve minor emissions or other beneficial functionality of the gas turbine engine. The present embodiments address all these needs and more.

SUMMARY

According to some aspects of the instant embodiments, a method is taught to align alternating first stage turbine stator nozzles with hot streaks exiting from a turbine engine combustor.

According to some aspects of the instant embodiments, a structure is taught wherein the gas turbine engine utilizes a number of combustor fuel nozzles and adjacent to which, a high pressure turbine includes a plurality of first stage stator nozzles. The combustor fuel nozzles and combustor exits are aligned with a leading edge of alternating first stage stator nozzle vanes so that increased mixing of hot streaks with cooling air at every other first stage stator vane is achieved. With the increased mixing of hot streak gas and cooling air at the aligned first stage stator nozzles, the hot streaks have reduced adverse effects on downstream blades and nozzle vanes of the multistage turbine as compared to prior art designs and before the creation of the present embodiments. Additionally, the structure of the present embodiments allows reduction of cooling air to the non-aligned first stage stator nozzle vanes so that the reduction in cooling air may allow for increased efficiency, improved durability, and/or improved emissions elsewhere in the turbine engine.

Furthermore, alternative embodiments are provided for a structure for enhanced cooling of a first stage stator nozzle by blunting a hot streak with a stator nozzle vane leading edge and mixing the hot streak with cooling air.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of these exemplary embodiments, and the manner of attaining them, will become more apparent and the nozzle feature will be better understood by reference to the following description of embodiments taken in conjunction with the accompanying drawings, wherein.

DETAILED DESCRIPTION

Figure 1:
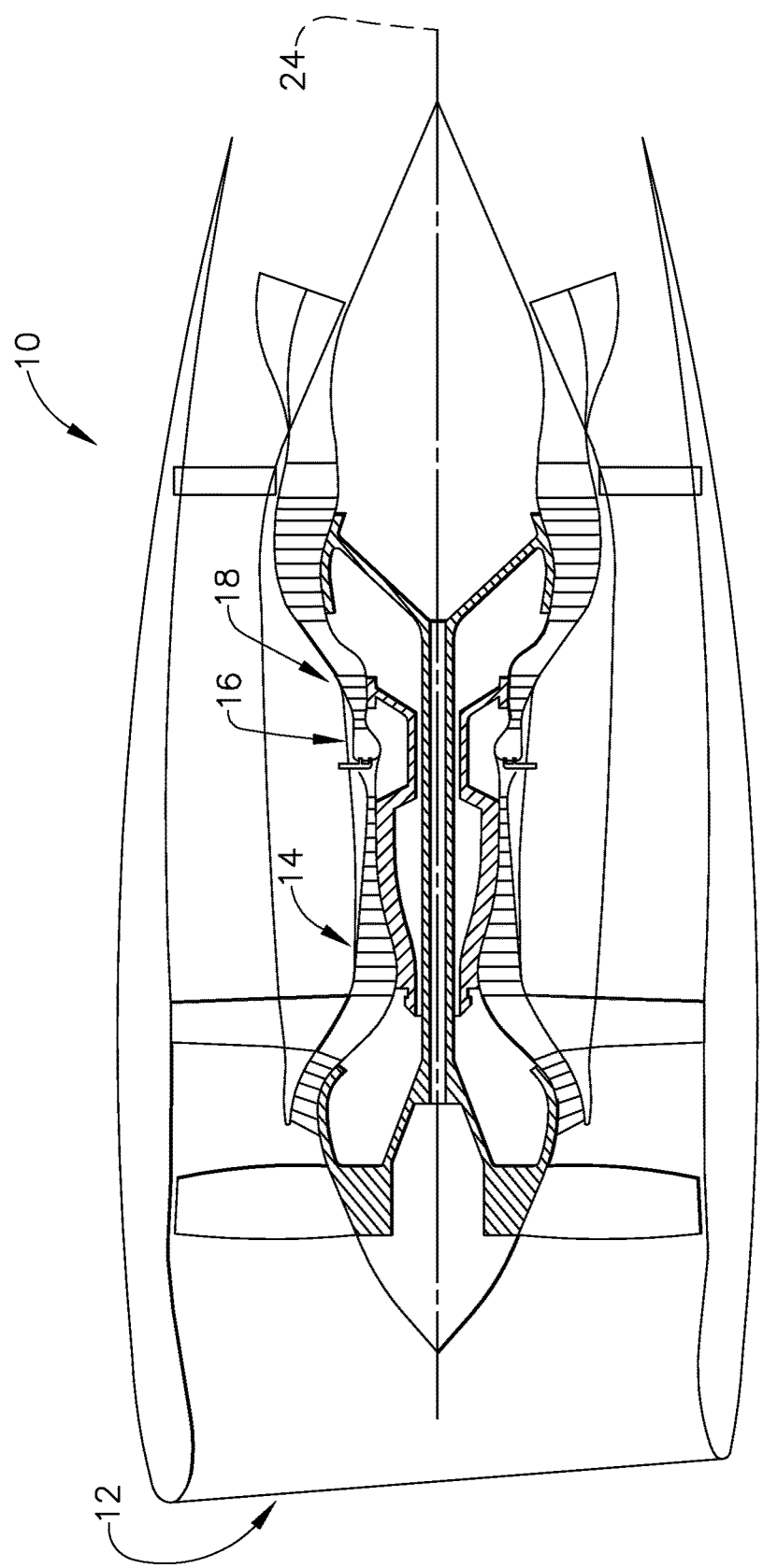
FIG. 1 is a schematic side section view of a gas turbine engine.
Figure 2:
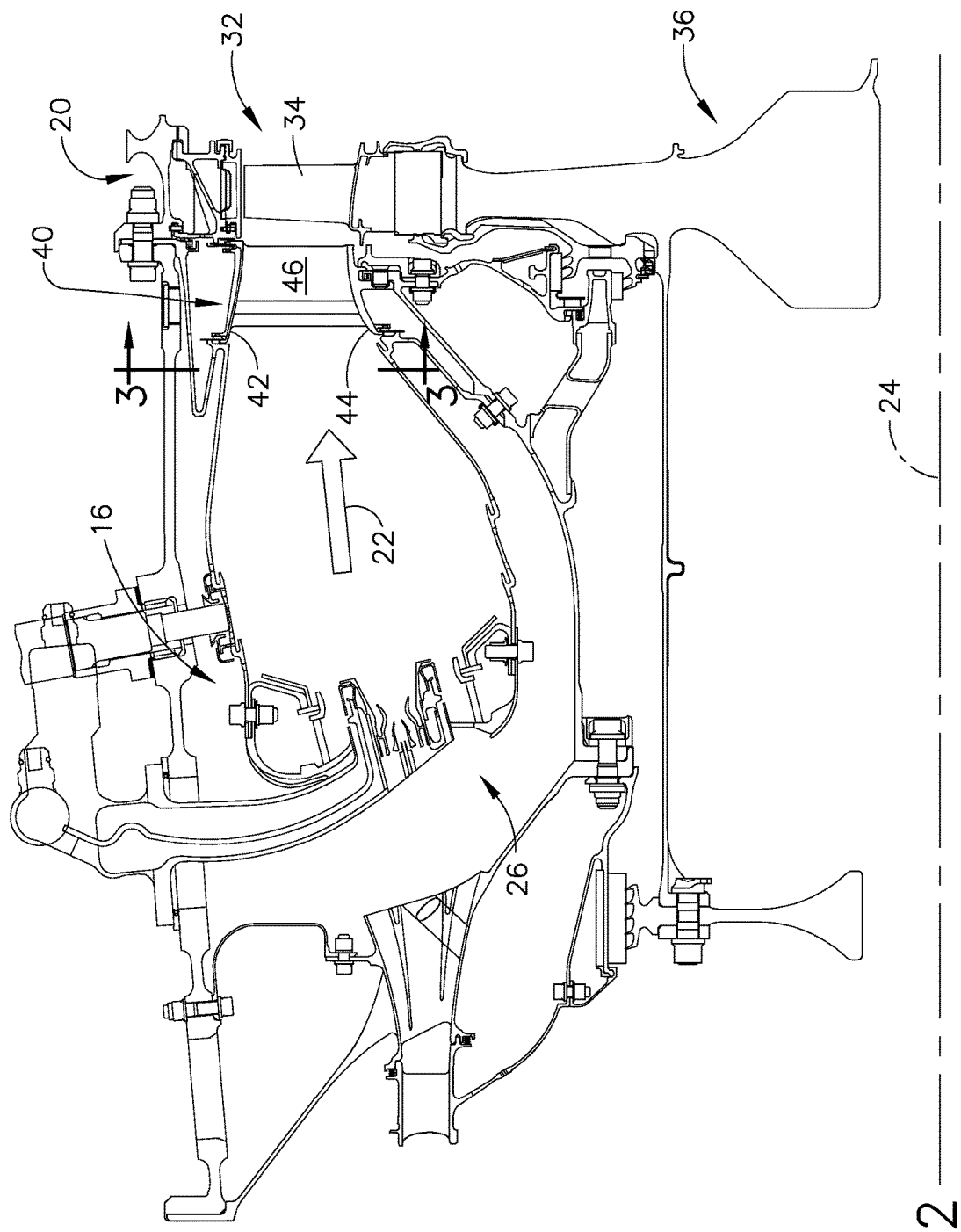
FIG. 2 is a schematic side view of hot exhaust gas passing through a first stage turbine nozzle.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

The present embodiments apply to the gas turbine engine, for example aeronautical, power generation, industrial or marine, in which a combustor burns fuel. Specifically combustor fuel nozzles discharge fuel, which is burned at the front of the combustor and the hot combustion gasses exit the combustor into a high pressure turbine. The instant structures and methods align the hot streak with the leading edges of the first stage nozzle vanes in order to improve mixing of hot streaks with cooling air at the first stage nozzle and reduce usage of cooling air at adjacent non-aligned first stage nozzle vanes. As a result, the oxidation and thermo-mechanical fatigue problems are reduced at the first stage nozzle and at the downstream turbine components. As used herein hot streak or hot streaks refer to a hot temperature of gas with the center zone of the hot streak being the hottest.

With reference to FIGS. 1-4, selected features of embodiments of hot streak alignment for gas turbine durability are shown and described. The present embodiments align the hot streak with the leading edge of every other first stage stator nozzle vane. Additionally, a method is taught for aligning the hot streak with leading edges of the first stage stator nozzle to reduce the usage of cooling air at the non-aligned nozzle vanes and in turn allows the cooling air to be used in other locations of the gas turbine engine.

Referring initially to FIG. 1, a schematic side section view of a gas turbine engine 10 is shown having an air inlet end 12, a compressor 14, a combustor 16 and a multi-stage turbine 18. The gas turbine 10 may be used for aviation, power generation, industrial, marine or the like. The gas turbine 10 is axis-symmetrical about engine axis 24 so that the components rotate thereabout. Depending on the usage, the engine inlet end 12 may alternatively contain multistage compressors rather than a fan. In operation, air enters through the air inlet end 12 of the engine 10 and moves through at least one stage of compression where the air pressure is increased and directed to the combustor 16. The compressed air is mixed with fuel and burned providing hot combustion gas at high temperature which exits a combustor toward the multi-stage turbine 18. At the multi-stage turbine 18, energy is extracted from the high temperature combustion gas causing rotation of turbine 18 blades which in turn cause rotation of a shaft which passes toward the front of the engine to continue rotation of the one or more compressor 14, a turbo fan or inlet fan blades, depending on the turbine design.

The present disclosure involves the interface between the combustor 16 and the multi-stage turbine 18. The hot combustion gas is depicted by arrow 22 (See FIG. 2) extending out of the combustor 16 through the turbine 18. The hot combustion gas desirably has an even temperature profile across the flow circumferentially. However, in reality, hot combustion gasses 22 typically have a hot streak 23 (See FIG. 4), which is often at the center of the combustion gas 22 area. This hot streak 23 is of a higher temperature than the other regions of the hot combustion gas 22. The hot streak 23 can cause damage to at least the high pressure turbine components by such modes as metal fatigue and the like.

Referring back to FIG. 2 a schematic side view of a combustor 16 and the turbine first stage 20 is depicted. In the side view, one of the combustor or combustor zones 16 of an annular array is shown spaced from the center axis 24. The combustor 16 includes a fuel input from fuel nozzle 26 from which a flame is emitted upon mixing the fuel source with compressed air and further upon ignition.

Opposite the combustor 16 in the axial direction is the first stage turbine 20 which includes a stator nozzle 40 and a rotor assembly 32. The rotor assembly 32 includes a plurality of blades 34 connected to and extending radially from a rotor or disk 36, which spins about the center axis shaft 24. The exemplary embodiment provides a stator nozzle 40 that is comprised of nozzle segments 40 being disposed opposite the combustor 16 in an annular array about the center line 24 of the gas turbine engine 10. Each turbine stator nozzle segment 40 has an outer band 42, an inner band 44 and at least one vane 46 extending between the inner and outer bands 42, 44. In an illustrated exemplary embodiment, the stator nozzle is made up of one or more nozzle segments 40 comprising two vanes 46. The inner and outer bands 44, 42 are curved to form arcuate segments about the centerline 24 so that a plurality of nozzle segments 40 defines an annular ring thereby forming the stator nozzle about the centerline 24 and within the engine 10. The vanes 46 extend generally in a radial direction and are curved to direct hot combustion gas 22 maximizing energy extraction at the first stage turbine blades 34.

Figure 3:
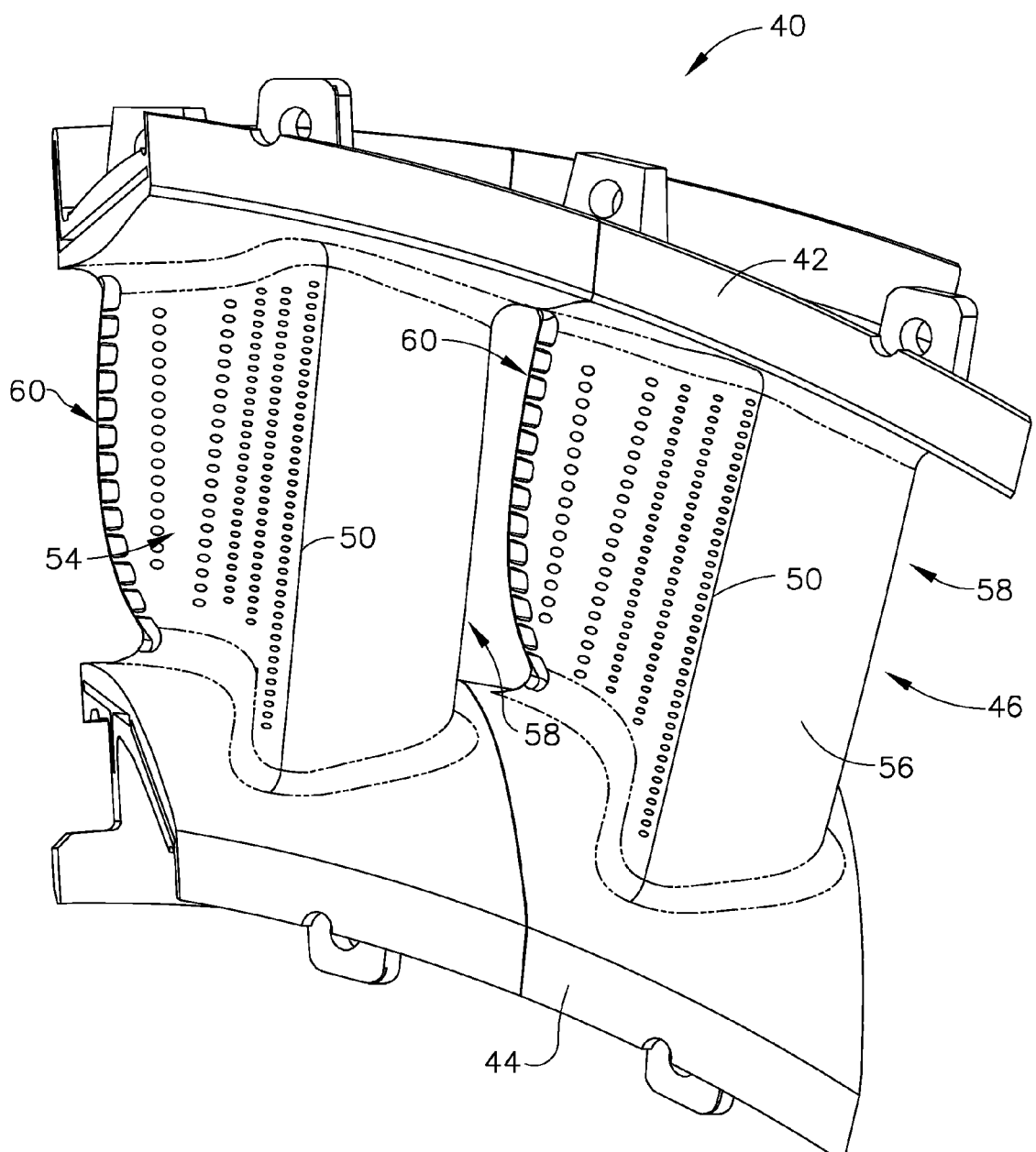
FIG. 3 is a perspective view of an exemplary first stage stator nozzle.

According to exemplary embodiments and with reference to FIG. 3, hot combustion gas 22 travels from the combustor 16 and is aimed at or aligned with a leading edge 50 of a nozzle vane 46. Each of the nozzle vanes 46 include a plurality of cooling holes which create a film layer of cooling air there along to provide cooling to the vanes and to the inner and outer band. The use of cooling holes inhibits failure of the stationary stator nozzle 40 due to high-temperature and other stress effects placed on the nozzle 40 by the hot gas 22.

With the hot streak 23 aimed at the leading edge 50 of the at least one vane 46, the combustion gas 22 will engage the vane 46 specifically and be mixed with cooling air passing through the stator nozzle 40 and outwardly through the apertures in the nozzle vane 46. Upon mixing of the combustion gas 22 on the surface of the nozzle vane 46, the downstream effect of the high temperature combustion gas 22 is decreased, limiting material damage to the downstream stator nozzles 40 and downstream turbine blades 34.

The perspective view of an exemplary embodiment illustrated in FIG. 3 illustrates a stator nozzle segment 40 including an arc-shaped inner band 44, an arc-shaped outer band 42 and a pair of vanes 46 extending radially therebetween. The leading edge 50 is depicted for reference to indicate the portion of the stator nozzle 40 that receives the hot streak 23 by way of selectably chosen alignment described herein. Each nozzle vane 46 is hollow and includes a pressure side 54, a leading edge 50, a high-curvature section 56 and a suction side 58 opposite the pressure side 54. The pressure side 54 extends to a trailing edge 60 where the pressure side 54 and suction side meet 58. The stator nozzle segment 40 includes vanes 46 having one or more cooling holes that create a film of cooling air on the vane 46 and the inner and outer bands 44, 42. This cooling air inhibits the material temperature of the nozzle 40 from rising to a level that will cause permanent damage to the system. Cooling air in the area of the nozzle vane 46 may be adjusted by increasing or decreasing the number of cooling air holes and/or by changing the dimensions with respect to flow area or flow volume of the cooling holes.

Figure 4:
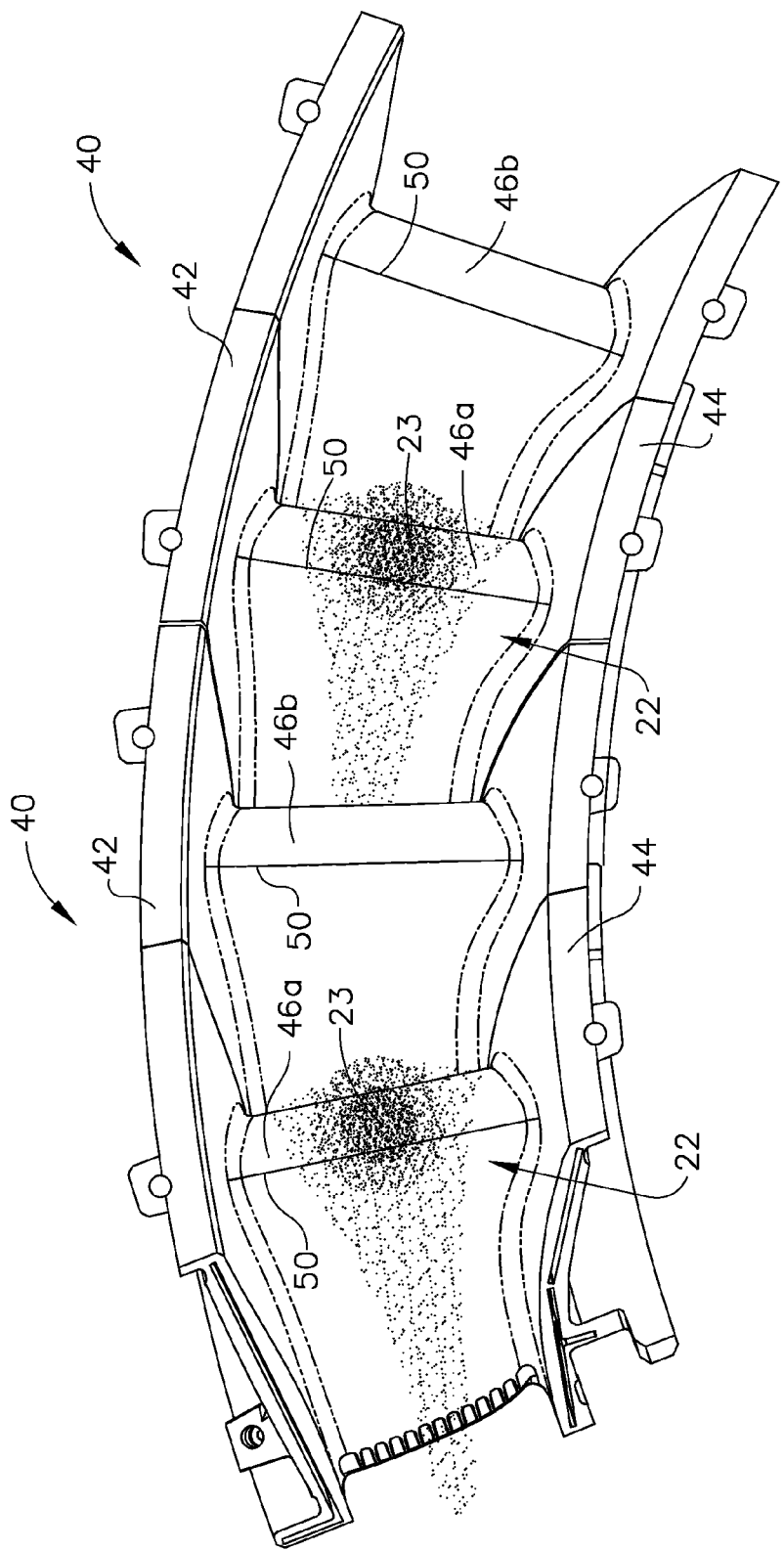
FIG. 4 is an axial section view of the gas turbine engine at the combustor nozzle looking toward the first stage nozzle.

Referring now to FIG. 4, by aligning the hot streak 23 with the leading edge 50 of the nozzle vane 46, the first stage cooling air will more efficiently mix with the hot streak 23 rather than allowing the hot streak 23 to pass between adjacent vanes 46. In turn, the impact of the hot streak 23 will be decreased for downstream components. Note that FIG. 4 illustrates vanes 46a and 46b as differentiated in embodiments to be described below. When vanes in general are described, note that vanes 46a and 46b together make up vanes 46.

In further detail with respect to nozzle segments 40, each nozzle vane 46 has a leading edge 50 which defines an entrance path for the hot combustion gas 22 and a trailing edge 60 which defines an exit path for hot combustion gas 22. Along the outer surface of the vane 46, a layer of cooling air is created by pumping compressed air to flow through the nozzle 40 and out of one or more cooling holes disposed along the surface. This flow cools the outer surface of the nozzle vane 46 relative to the temperature of the hot combustion gas 22, thereby inhibiting fatigue damage due to the high temperatures on the nozzle 40. The cooling air also blunts the hot streak 23 that is created from the combustor 16.

Embodiments include those wherein the hot streak 23 is aimed or aligned with the leading edge 50 of the first stage turbine nozzle vane 46 so that the leading edge 50 breaks up the hot streak 23 and causes mixing with the flow of cooling air passing from the nozzle 40. Alternative embodiments include those wherein the high temperature combustion gas 22 is inhibited from passing unimpeded between adjacent nozzle vanes 46 thereby preventing the hot streak 23 from directly engaging downstream components of the gas turbine 10.

Referring again to FIG. 4, a perspective view of stator nozzle 40 details is shown. The view of FIG. 4 is taken with respect to hot gas 22 flow exiting combustor 16. Illustrated, for example purposes only, not meant to be limiting, is a pair of stator nozzle segments 40 wherein the viewer is looking aft through the stator nozzle 40 and (with reference again to FIG. 2) on toward the rotor assembly 32 of the turbine 18. Exemplary embodiments provide two vanes 46a, 46b, each being located on a single stator nozzle segment 40. As will be seen below in further detail by description, alternative embodiments provide other arrangements and quantities of vanes 46a and 46b. The combustor 16 fuel nozzle 26 in conjunction with the exit of the combustor 16 (See also FIG. 2) may be aimed directly at the first vane 46a, or may be aimed at the second vane 46b, or at any aim point therebetween, such aiming to be selected by a user as desired in creating any particular embodiments. The illustrated exemplary first vane 46a of FIG. 4 receives the hot streak 23 and is referred to as an aligned vane 46a. The adjacent vane 46b which does not receive the hot streak 23 is referred to as a non-aligned vane 46b. As a result of this arrangement of aligned 46a and non-aligned 46b vanes, the non-aligned nozzle vanes 46b require less cooling air as they are selectably placed to be out of a direct flow path of the hot streak 23. Embodiments provided in this manner are referred to as preferential cooling embodiments. By reducing the amount of cooling air needed at these non-aligned nozzle vanes 46b, examples of such preferential cooling embodiments provide increased amounts of cooling air to other parts of the gas turbine engine 10 than prior designs not including the present embodiments.

In further detail, hot streaks 23 are aimed at the leading edge 50 of selected airfoil vanes 46 of an opposed first stage stator nozzle 40. The alignment is indicated by position of the hot streak 23, shown stippled in FIG. 4, on the leading edge 50 of aligned vanes 46a. While it is possible that the outer extremities of the highest temperature areas may not fully engage the aligned vane 46a, embodiments include those wherein the central point of the hot streak 23 is directed at the aligned first stage stator nozzle vane 46a. At this aligned vane 46a, the cooling air forms a film of cooling air over the vane 46a. This film of cooling air mixes with the hot streak 23 to reduce the hot streak 23 temperature and create a more even temperature distribution across the combustion exhaust gas 22 flow.

With further details as to orientation, the hot streak 23 is aligned in a radial direction at the center of the aligned vanes 46a. However, the center of the hot streak 23 need not be at the center of the leading edge 50, but instead may be at some other position in a wide range of embodiments, selectably chosen to be along the leading edge 50. Additionally, alternatives provide that the hot streak 23 is aligned in a circumferential direction illustrated by example to be the direction that the inner and outer bands 44, 42 extend. This circumferential alignment is predicated on the number of combustor 16 fuel nozzles 26 in relation to the number of nozzle segments 40. A turbine engine 10 may have as many fuel nozzles 26 as desired. An exemplary embodiment provides that a total of 12 fuel nozzles 26 are disposed within the combustor 16 and spaced circumferentially with respect to the axis 24 of the engine 10. Alternatives include those wherein the fuel nozzles 26 are arranged in a uniform spacing around the engine 10. For the example above that includes 12 fuel nozzles 26, if we divide a total of 360 degrees around the engine by the number of fuel nozzles, in this example, 12, we see that for a uniform spacing of fuel nozzles 26, one fuel nozzle is found at every 30 degrees around the engine. Furthermore with respect to mathematical calculations relevant to description of embodiments herein, in general, within the engine 10, embodiments provide for dividing the total number of combustor fuel nozzles 26 by the number of vanes 46 of the stator nozzles 40 in order to derive a ratio of vanes 46a, 46b with respect to fuel nozzles 26. See below for further details and examples of this ratio. Opposite of the fuel nozzles 26 in an axial direction is a leading edge 50 of a vane 46. Embodiments include those wherein the hot streak 23 resulting from flow out of each combustor 16 exit directly impacts the opposed airfoil or vane 46.

Each combustor nozzle 26 is aligned with a nozzle vane 46a thereby providing flow of hot combustion gas 22 over the aligned nozzle vane 46a. Configurations of embodiments include those wherein one or more non-aligned vanes 46b are placed between the aligned vanes 46a. In such configurations, some hot combustion gas 22 moves over the non-aligned nozzle 46b; however, such combustion gas 22 is of a lower temperature than the gas 22 moving over the aligned vane 46a. Therefore, less cooling air is required at the non-aligned nozzle 46b. As such, embodiments include those wherein of a total quantity of cooling air available and with respect to prior art designs not utilizing the present embodiments, proportionately less air is provided to cool vanes 46b, allowing proportionately more air to be provided to meet the cooling needs at vanes 46a.

The exemplary embodiments provide structure which will limit fatigue and oxidation by aligning the combustor 16 fuel nozzles 26 with the leading edge 50 of the first stage turbine stator nozzles 40 in order to aim the hot streaks 23 directly at the leading edge 50. These leading edge 50 angled vane 46a, 46b surfaces have a plurality of apertures which provides cooling air to mix with the hot streak 23 at the first stage nozzle 40 and which further limit possible adverse effects of the hot streak 23 downstream. As a result, embodiments provide that downstream turbine components have increased durability over previous designs not utilizing the present embodiments. Alternative embodiments provide a continuous mixing and cooling of the hot streak 23 along the leading edge 50 of the aligned vanes 46a.

Preliminary alignment of the hot streak 23 is performed via computational fluid dynamics (CFD). In accordance with the present embodiments, various techniques may be utilized including, but not limited to, experimental determinations such as engine tests, rig tests and the like. Any of such may be helpful in determining the circumferential alignment of the hot streaks 23 with aligned vanes 46a. Due to mixing of fuel and air, the hot streak 23 may or may not be in direct alignment with a fuel or combustor 16 nozzle 26. However upon the computational model and analysis, the hottest portion of hot streak 23 of the combustion gas 22 profile is aligned with the stage one nozzle lead edge 50.

According to some embodiments, the hot streak 23 is blunted by the lead edge 50 of the stator nozzle vane 46. For example not meant to be limiting, a turbine engine 10 comprises a combustor 16 having N number of fuel nozzles 26 annularly arranged and spaced from one another. The turbine 10 includes N number of stator nozzles 40 having N number of first stage stationary vanes 46a axially aligned with and downstream from said N number of fuel nozzles 26. The turbine 10 further includes a plurality of first stage rotating blades 34 downstream of said first stage stationary vanes 46a. Leading edges 50 of said N number of the first stage stationary aligned vanes 46a receive hot streaks 23 from the fuel nozzle 26 and combustor 16 upon gas 22 flow arriving at stator nozzle 40 at said first stage stationary vanes 46a. Additionally, M adjacent non-aligned vanes 46b are disposed between each of the N number of first stage stationary aligned vanes 46a. The hot streaks 23 impinge on the N number of first stage stationary aligned vanes 46a to mix with cooling air passing through the N number of first stage stationary vanes 46a. By aligning specific nozzle vanes 46a, decreased volume of cooling air may be utilized at the non-aligned nozzle vanes 46b. Embodiments include those wherein vanes 46 are provided in ratios of aligned 46a and non-aligned 46b vanes with respect to fuel nozzles 26. For these embodiments, N refers to a count of aligned vanes 46a and M refers to a count of non-aligned vanes 46b. Embodiments include those wherein the count, N, of aligned vanes 46a is equal to the count of fuel nozzles 26, also N. Going on, the ratio is expressed in the form of (N+M):N with respect to fuel nozzles 26. For example not meant to be limiting, a ratio of vanes 46a, 46b to fuel nozzles 26, is expressed in integer ratios for (N+M):N being 1:1, 2:1, 3:1 or more; wherein, for further example, an engine 10 having one aligned vane 46a for each non-aligned vane 46b would have an integer ratio of 2:1.

Embodiments also include those wherein a method of improving vane 46a, 46b durability in a gas turbine engine 10 having N number of fuel nozzles 26 and N number of aligned first stage vanes 46a comprises aligning the first stage vane 46a air foils circumferentially and axially opposite the N number of fuel nozzles 26, blunting the hot streak 23 with cooling air at a leading edge 50 of the N number of the first stage vanes N 46a, reducing cooling air to M non-aligned first stage vanes 46b and, increasing cooling air to alternate components of the gas turbine engine 10. As above, embodiments include those wherein vanes 46a, 46b are provided in ratios of aligned 46a and non-aligned 46b vanes with respect to fuel nozzles 26. For these embodiments, N refers to a count of aligned vanes 46a and M refers to a count of non-aligned vanes 46b. Embodiments include those wherein the count, N, of aligned vanes 46a is equal to the count of fuel nozzles 26, also N. Going on, the ratio is expressed in the form of (N+M):N with respect to fuel nozzles 26. For example not meant to be limiting, a ratio of vanes 46a, 46b to fuel nozzles 26, is expressed in integer ratios for (N+M):N being 1:1, 2:1, 3:1 or more.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A method of hot streak alignment to improve gas turbine durability, comprising:
    igniting fuel and air at a combustor having a fuel nozzle thereby creating a hot streak of combustion gas;
    aiming said hot streak at a leading edge of a stator nozzle vane;
    providing one or more cooling holes disposed upon said stator nozzle vane adjacent to said leading edge;
    passing cooling air through said vane and said one or more cooling holes adjacent said leading edge; and,
    mixing of said combustion gas and cooling air to limit temperature of said combustion gas at downstream components;
    further comprising:
    a ratio of vanes to fuel nozzles being at least 2:1 wherein for a 2:1 ratio, the vanes are disposed within the stator nozzle in pairs, the pairs being made up of an aligned vane and a non-aligned vane;
    the hot streak being directly aimed at the aligned vane, and not directly aimed at the non-aligned vane; and,
    the step of passing said cooling air through said vane further comprises passing said cooling air through said aligned vane and through said non-aligned vane.

2. The method of claim 1 further comprising providing increased cooling flow on aligned stator nozzle vanes than on non-aligned vanes.

3. The method of claim 1 further comprising providing more of said cooling holes on aligned nozzle vanes than on non-aligned vanes.

4. The method of claim 1 further comprising directing a central point of said hot streak at said leading edge.

5. The method of claim 4, said central point of said hot streak being at a center of said leading edge.

6. The method of claim 4, said central point of said hot streak being spaced from a center of said leading edge.

7. The method of claim 1, wherein the step of passing said cooling air further comprises providing a thin film of moving air moving through as well as over both of the aligned stator nozzle vane and the non-aligned stator nozzle vane.

8. The method of claim 1, further comprising use of preferential cooling of the stator nozzles.

9. The method of claim 8 further comprising increasing cooling at other engine components by said preferential cooling.

10. The method of claim 9 further comprising decreasing cooling air usage at non-aligned vanes by said preferential cooling.

11. The method of claim 1 further comprising aligning said fuel nozzle radially with said aligned vane.

12. The method of claim 10 further comprising aligning said fuel nozzle circumferentially with said aligned vane.

13. The method of claim 1, decreasing said cooling air at said non-aligned vanes relative to the cooling air provided to said aligned vanes.

14. A turbine engine, comprising:
    a combustor having N number of fuel nozzles annularly arranged and spaced from one another;
    a stator nozzle downstream from the combustor;
    the stator nozzle further comprising N number of stator vanes axially aligned with and downstream from said N number of fuel nozzles; and,
    the turbine engine further comprising a plurality of first stage rotating blades downstream of said aligned stator vanes of the stator nozzle;
    further comprising M number of non-aligned stator vanes being disposed adjacent to and between each of the N number of aligned stator vanes.

15. The turbine engine of claim 14 wherein hot gas flows from a fuel nozzle within the combustor and through the combustor exit thereby impacting upon the stator nozzle and leading edges of said N number of aligned stator vanes receive said hot streaks.

16. The turbine engine of claim 14 wherein the hot streaks impinge on the N number of aligned vanes and the hot streaks mix with cooling air passing through the aligned vanes thereby aligning specific stator nozzle vanes.

17. The turbine engine of claim 16 wherein the aligning of specific nozzle vanes results in a decreased volume of cooling air required at the non-aligned nozzle vanes.

18. A method of improving vane durability in a gas turbine engine having N number of fuel nozzles disposed within N number of combustors and N number of aligned first turbine vanes comprises the steps of:
    aligning the first stage vane airfoils circumferentially and axially opposite the N number of fuel nozzles;
    blunting a hot streak of hot gas exiting the combustors with cooling air at a leading edge of the N number of the first stage aligned vanes, thereby reducing cooling air to M number of first stage non-aligned vanes; and,
    increasing cooling air to alternate components of the gas turbine engine.

* * * * *